(12) United States Patent
Hatstat et al.

(10) Patent No.: US 10,909,341 B2
(45) Date of Patent: Feb. 2, 2021

(54) DATA PROCESSING REDUCTION IN BARCODE READING SYSTEMS WITH OVERLAPPING FRAMES

(71) Applicant: Datalogic Automation, Inc., Telford, PA (US)

(72) Inventors: Andrew Hatstat, Lansdale, PA (US); Claudio Saporetti, Bologna (IT); David Kliebhan, Newtown, PA (US)

(73) Assignee: Datalogic Automation, Inc., Telford, PA (US)

( * ) Notice: Subject to any disclaimer, the term of this patent is extended or adjusted under 35 U.S.C. 154(b) by 0 days.

(21) Appl. No.: 15/335,376

(22) Filed: Oct. 26, 2016

(65) Prior Publication Data

US 2018/0114323 A1   Apr. 26, 2018

(51) Int. Cl.
| | | |
|---|---|---|
| G06K 7/14 | (2006.01) | |
| G06T 7/13 | (2017.01) | |
| G06K 9/32 | (2006.01) | |
| G06K 9/34 | (2006.01) | |
| G06T 7/11 | (2017.01) | |
| G06T 7/187 | (2017.01) | |

(52) U.S. Cl.
CPC ......... *G06K 7/1413* (2013.01); *G06K 7/1443* (2013.01); *G06K 7/1452* (2013.01); *G06K 9/3233* (2013.01); *G06K 9/342* (2013.01); *G06T 7/11* (2017.01); *G06T 7/13* (2017.01); *G06T 7/187* (2017.01)

(58) Field of Classification Search
None
See application file for complete search history.

(56) References Cited

U.S. PATENT DOCUMENTS

| | | | | |
|---|---|---|---|---|
| 5,466,921 A | * | 11/1995 | Lapinski | G06K 7/0166 235/462.12 |
| 5,686,716 A | * | 11/1997 | La | G06K 7/14 235/436 |
| 6,142,376 A | * | 11/2000 | Cherry | G06K 7/10861 198/502.1 |
| 6,483,935 B1 | * | 11/2002 | Rostami | G01N 21/8901 382/141 |
| 6,556,624 B1 | * | 4/2003 | Orchard | H04N 21/234327 375/240.12 |
| 8,740,081 B2 | | 6/2014 | Negro et al. | |

(Continued)

FOREIGN PATENT DOCUMENTS

| | | |
|---|---|---|
| EP | 1894141 A2 | 3/2008 |
| WO | 2015079461 A1 | 6/2015 |

*Primary Examiner* — Kim Y Vu
*Assistant Examiner* — Nathan J Bloom
(74) *Attorney, Agent, or Firm* — Foley & Lardner LLP (57) ABSTRACT

A system and method for processing a machine-readable code associated with an object moving relative to an imaging device may include imaging the machine readable code. A determination may be made as to whether image data of the machine-readable code is clipped along a leading edge of a first image frame. If the machine-readable code is determined to be clipped, (i) image data of the machine-readable code in the first image frame may be skipped, and (ii) image data contained in a subsequent image frame may be processed. Otherwise, if the code is not determined to be clipped, processing image data in the subsequent image frame may be skipped.

19 Claims, 10 Drawing Sheets

(56) References Cited

U.S. PATENT DOCUMENTS

| | | | | |
|---|---|---|---|---|
| 2006/0164541 | A1* | 7/2006 | Olmstead | H04N 5/2353 348/360 |
| 2009/0095047 | A1* | 4/2009 | Patel | G06K 7/10722 73/1.01 |
| 2012/0002881 | A1* | 1/2012 | Maeda | G06K 9/00677 382/195 |
| 2012/0261473 | A1* | 10/2012 | Bombaugh | G06K 7/10603 235/462.11 |
| 2016/0104020 | A1* | 4/2016 | Bachelder | G06K 7/1465 235/462.12 |

* cited by examiner

DATA PROCESSING REDUCTION IN BARCODE READING SYSTEMS WITH OVERLAPPING FRAMES

BACKGROUND

In transportation and logistics processing, machine-readable code (e.g., barcode) reading applications with 2D imagers are often challenged with high transport speeds and a mix of large and small codes. In order to read the highest density machine-readable codes, a long focal length lens is typically used to have enough resolution to resolve the small code elements. Using a long focal length lens has the effect of narrowing the field-of-view both across a conveyer belt and direction of travel (vertical FOV) of objects being moved by the conveyer belt. In addition, to minimize the cost of a machine-readable code reading system, camera designs are being pushed toward optical arrangements that cover a wide field-of-view across the belt, but only a narrow field-of-view along the direction of travel. Such designs include sensors having aspect ratios of 2:1 or greater as well as split sensor architectures, such as field-of-view expanders and depth-of-field expanders that divide the vertical field-of-view into sections in order to cover either more width or depth at the expense of less vertical field-of-view.

The downside of the field-of-view design tradeoff is that it is much more difficult to ensure that a long 1D barcode fits completely within the narrow field-of-view along the direction of travel. In some cases, it may be possible to decode a barcode by stitching together pieces of the code from successive images, generally known as code stitching. However, stitching technology is not implemented in all reading systems nor is it practical for all barcode types and arrangements. For example, there are known problems with mis-decoding when code stitching with stacked codes and codes with repeating digits, especially when used with symbologies without a checksum, such as I2of5. A further drawback to using a reduced field-of-view is that existing code imaging systems are unable to provide the customer with a single high quality image of the machine-readable code. In summary, the ability to capture and process a whole code within a single image can lead to a performance advantage compared to a code stitching solution.

In order to ensure that at least one complete image of the longest code can be captured, frames must be acquired in rapid succession. For example, in an application with a 120 mm long code and 162 mm vertical field-of-view with belt speed 2.5 m/s, images must be acquired at least every 162−120=42 mm of belt travel, which equates to 60 frames/second or 540 megapixels per second with a 9 MP sensor. Such large amounts of data can present a serious challenge to decoding using a low-cost processor, such as a dual core ARM A9, that has a lower bandwidth than higher-cost processors. The use of a lower-cost processor, of course, is a more cost-effective solution than compared with higher-cost processors or multiple cameras with additional processors. As an example, rather than a single camera capturing and processing 30 frames per second, two cameras each may capture and process 15 frames per second. The use of higher-cost processors or additional cameras, however, is expensive and undesirable for transportation and logistics processing.

SUMMARY

To provide for reduced data processing in machine-readable code reading systems, overlapping image frames may be used. A determination as to whether image data representative of a code is clipped at a front edge of the image frames, so as to determine whether or not to process an image frame and/or whether to skip processing image data of subsequent image frames.

One embodiment of a system for processing a machine-readable code associated with an object moving relative to an imaging device may include an imaging device (i) including an image sensor configured to capture multiple image frames at a frame rate and (ii) having a field-of-view (FOV) being greater than or equal to a sum of a length of a machine readable code and distance of travel of the moving object between successive frames. The frames have a leading edge and a trailing edge, and may be arranged in an overlapping manner along the direction of travel of the moving object. A non-transitory memory may be configured to store image data captured in image frames. A processing unit may be in communication with the imaging device and non-transitory memory, and be configured to process an image of the machine-readable code associated with a captured image frame, and determine whether image data of the machine readable code is clipped along a leading edge of a first image frame. If the code is determined to be clipped, the processing unit may skip processing image data of the machine readable code in the first frame and process image data contained in a subsequent image frame. Otherwise, if the code is not clipped, the processing unit may skip processing image data in the subsequent image frame.

One embodiment of a method for processing a machine-readable code associated with an object moving relative to an imaging device may include imaging the machine readable code. A determination may be made as to whether image data of the machine-readable code is clipped along a leading edge of a first image frame. If the machine-readable code is determined to be clipped, (i) image data of the machine-readable code in the first image frame may be skipped, and (ii) image data contained in a subsequent image frame may be processed. Otherwise, if the code is not determined to be clipped, processing image data in the subsequent image frame may be skipped.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
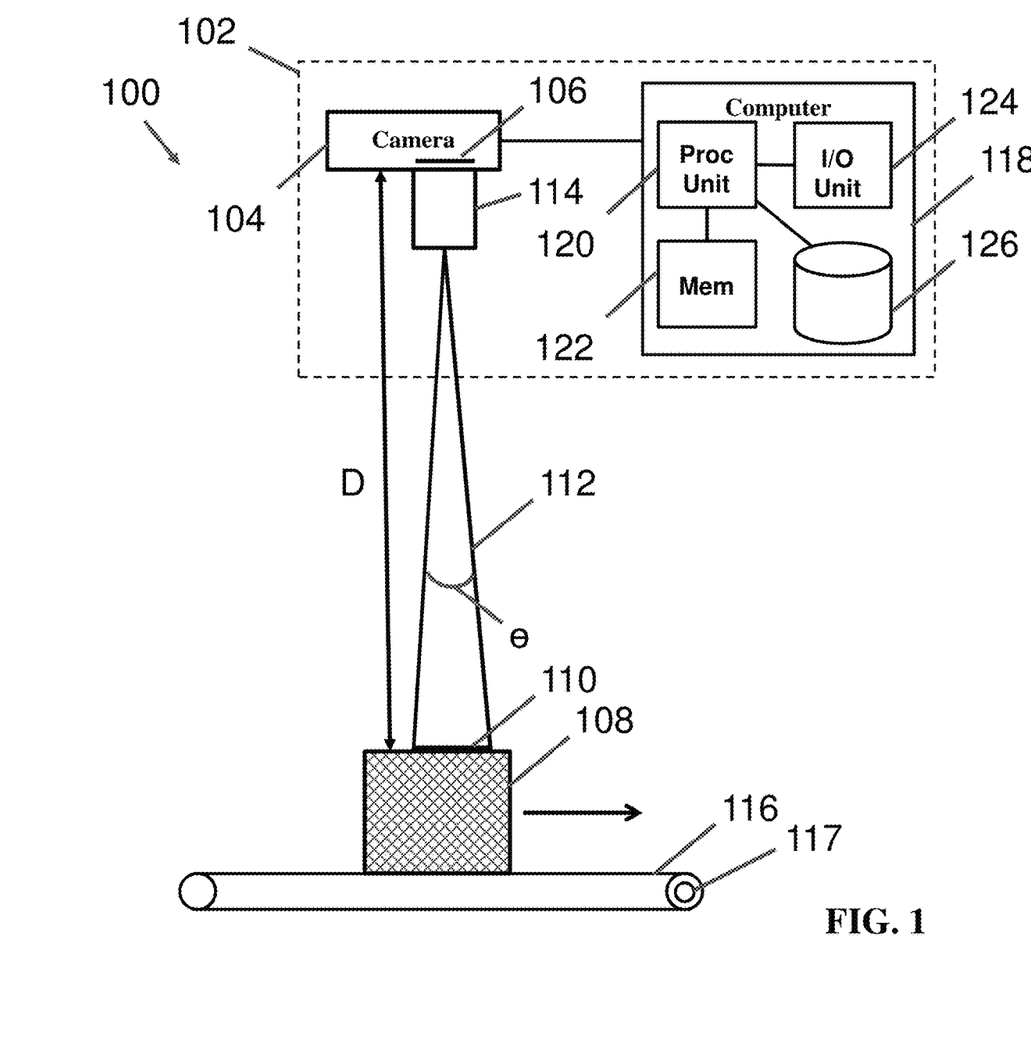
FIG. 1 is an illustration of an illustrative logistics processing environment in which an imaging device inclusive of a 2D area camera may be utilized to image codes on objects being moved relative to the imaging device.

With regard to FIG. 1, an illustration of an illustrative logistics processing environment 100 in which an imaging device 102 inclusive of a camera 104, such as a 2D imaging or area camera, may be utilized to scan or image machine-readable codes ("codes") on objects, which may range in height, size, and shape, being moved relative to the imaging device 102 is shown. The term imaging device is interchangeably used with the term camera in certain aspects. The codes may be barcodes, QR codes, or any other machine-readable code capable of being imaged and read using a decoder, as understood in the art. The camera 104 may be configured to capture images using imaging successive image frames ("frames") that repeat on a periodic or aperiodic basis, as further described herein.

The camera 104 may include a pixel array or optical sensor 106 of which multiple subsets of pixels (not shown) of the pixel array may be used to image an object 108 on which a label 110 inclusive of a code (not shown) is printed. The camera 104 may capture an optical image of the label 110 with a field-of-view 112 defined by an angle θ fixed by a lens 114. The angle θ is fixed by the focal length of the lens 114 and row spacing of the pixel array 106.

The object 108, which may be a parcel, is shown to be positioned on a conveyer belt 116 to be moved in front of the camera 104 for imaging of the label 110. For high-speed logistics processing environments, the conveyer belt 116 may be configured to move at speeds of 600 feet per minute or 3.3 meters per second, for example. To track distance of the object during imaging, a sensor 117, such as an optical encoder, may be used. An output measurement of the sensor 117 may be communicated to a computer 118, which may or may not be integrated with the imaging device 102, for optionally synchronizing imaging by the camera 104 with respect to distance traveled by the object 108. It should be understood that alternative sensors, such as a speedometer, may be used to measure speed of the conveyer belt 116, and a mathematical integral may be performed to determine movement of the object 108. Image resolution in the direction of travel may be fixed by frame rate of the pixel array 106, and is independent of distance D from the lens 114 of the camera 104 to the object 108. Pixel overlap increases vertically (i.e., along the direction of movement) as the distance increases.

The computer 118 may be configured with a processing unit 120, non-transitory memory 122, input/output (I/O) unit 124, and storage unit 126, which may be solid-state or other memory type for storing raw image data collected by the camera 104 and processed image data, as described hereinbelow. The processing unit 120 may be configured to execute software for imaging and/or processing (e.g., reading) images of codes applied to or associated with objects. To create a cost effective system, the processing unit 120 may include a low cost, and low bandwidth processor. For example, the processor may have a processing speed of 100 Mflops, as compared to high-end processors with a processing speed of 3,000 Mflops. The codes, which may be machine-readable codes, text, icons (e.g., hazardous material), or otherwise, may be affixed to an object as applied to a shipping label, for example, or attached to a carry tray (not shown) on which objects may be placed during logistics processing. The memory 122 may be configured to store software and/or data, such as image data, and be used during processing of image data. The I/O unit 124 may be configured to handle communications with other devices, such as the camera 104, Internet, position or other sensors of the conveyer, or other devices using one or more communications protocols, as understood in the art.

As an example, an application that requires reading both 10 and 20 mil Code 128, the latter of which could be up to 120 mm in length. If the conveyor speed is 2.4 m/s, in order to maximize the reading area across the belt, a field-of-view expander mirror arrangement may be used to split the sensor into two halves. Given a 9 megapixel (MP) sensor (4096× 2172) with 3.45 um square pixels, after the split of the sensor, an effective sensor height of approximately 1000 pixels exists. For this application, a 25 mm focal length lens may be mounted approximately 1500 mm from the conveyer belt with a near reading distance at 1200 mm. The worst case field-of-view along the direction of travel is therefore 162 mm (in the near reading distance), which is only about 40% longer than the longest code.

Figure 2:
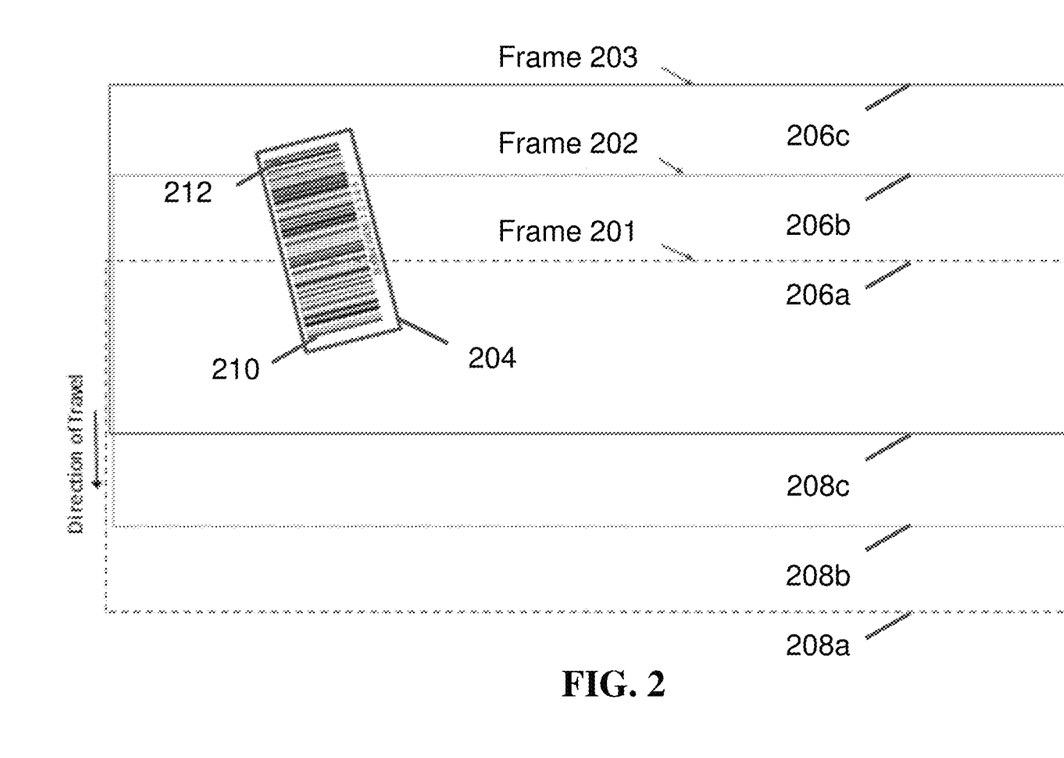
FIG. 2 is an illustration of an illustrative set of successive image frames (frames 1, 2, and 3, respectively) that capture an image of a code on a moving object (not shown)

With regard to FIG. 2, an illustration of an illustrative set of successive image frames 201, 202, 203 that capture an image of a code 204 on a moving object (not shown) is shown. The camera is oriented relative to the conveyor belt such that the object in the scene appears to move from the top to bottom in each successive frame. In one embodiment, an overlap between successive image frames may be approximately 74% in the near reading distance and 79% at the far reading distance. In such a configuration, a high amount of redundant information between image frames exists. Using overlapping, successive image frames may be used to avoid consuming processing bandwidth searching the same area twice.

The image frames are shown to have respective leading edges 206a-206c (collectively 206) and a trailing edges 208a-208c (collectively 208). As shown, the code 204 is clipped by frames 201 and 202, which means that the leading edges 206a and 206b cross the code 204 between an open character or symbol 210 and a close character 212 at the front and back ends of the code 204, so that the code 204 crosses between two successive image frames, such as image frames 201 and 202. As further shown, the code 204 is fully encapsulated in frame 203. To determine that the code 204 is clipped, the code 204 may be processed to determine that either the open character 210 or close character 212 is not within an image frame being processed.

To provide for the successive frames, the camera is to have sufficient vertical field-of-view to be able to image an entire barcode in a single image frame, as described hereinabove. The frame rate is also to be tall enough to capture the code given the belt speed and vertical FOV. The processes described herein assume the vertical field-of-view constraint has been met, where the constraint is given as follows in equation 1:

$$fov \geq l + d \qquad \text{(eqn. 1)}$$

Where, d=belt travel between successive frames [mm], and is a function of the belt speed and the camera frame rate;

l=barcode length [mm];

fov=field of view along the direction of travel at the near reading distance [mm].

As an example, let l=40 mm; let fov=160 mm; let d=50 mm

Using these parameters, the constraint equation 1 above is satisfied because 160 mm 40 mm+50 mm.

Furthermore, and as another example, let s=belt speed (mm/s); let f=frame rate (frames per second); define d=s/f.

If the belt speed is 1000 mm/s, for example, then the camera frame rate f=s/d=1000/50=20 frames/second. The formula fov≥l+d can be rearranged to give fov≥s/(fov−l), which shows that the frame rate is to be greater than a function of the belt speed, the barcode length, and the vertical field-of-view.

Process 1A—Frame Skipping

To reduce bandwidth usage of a processing unit, one embodiment may include frame skipping. Frame skipping include imaging a scene by the camera in each successive image frame, but skipping processing of particular frames, time savings for a processing unit results, which is effectively an increase of bandwidth for the processing unit.

Figure 3A:
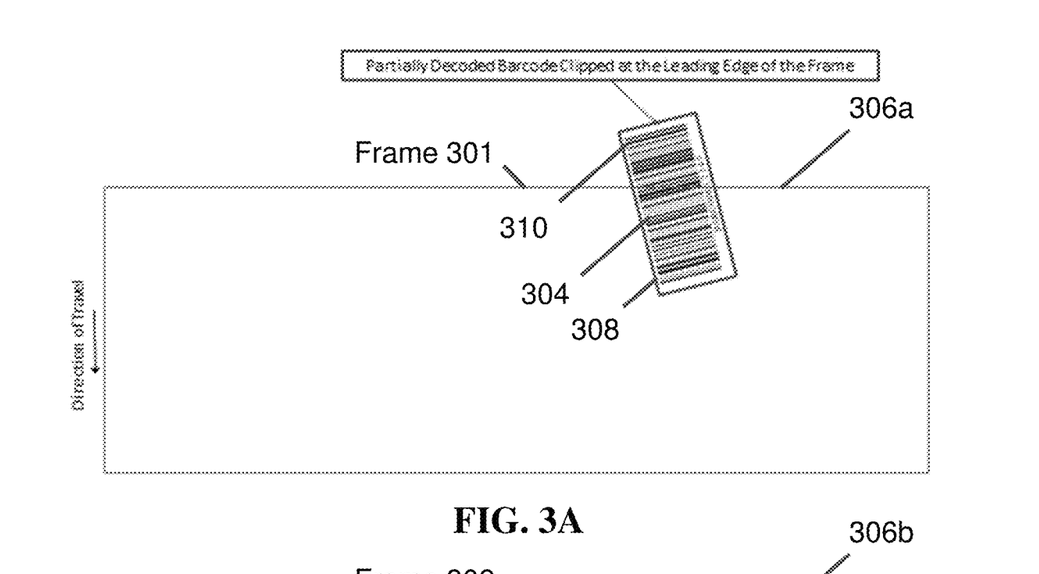
FIGS. 3A and 3B are an illustration of an image frame is shown to include a machine-readable code, in this case a barcode, that is being clipped by a leading edge of the image frame.
Figure 3B:
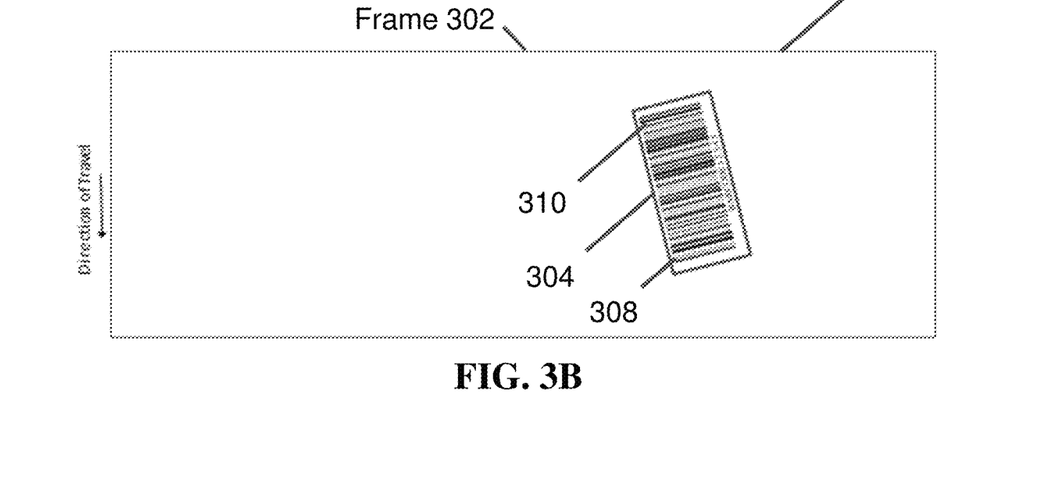

With regard to FIGS. 3A and 3B, illustrations of an image frame 301 is shown to include a machine-readable code 304, in this case a barcode, that is being clipped by a leading edge 306a of the image frame 301 at a time $T_0$. In other words, the code 304 is capable of being partially decoded due to being clipped by the leading edge 306a, where at least one of an open character 308 or close character 310 are not read in the image frame 301. As the code 304 moves relative to a camera (not shown), the code 304 is shown to be entirely within the image frame 302 at a later time $T_1$.

Figure 4:
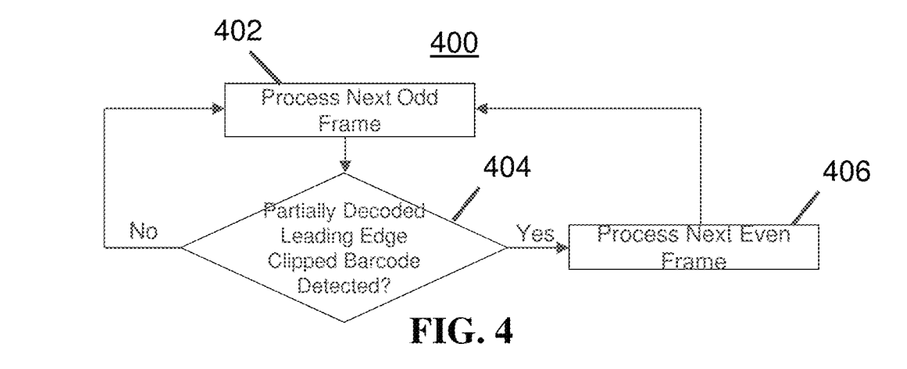
FIG. 4 is a flow diagram of an illustrative frame skipping process.

With regard to FIG. 4, a flow diagram of an illustrative frame skipping process 400 is shown. The process 400 may start at step 402, where a next odd frame (e.g., frame 1) may be processed. In processing the next odd image frame, the first image frame (e.g., frame 1 or image frame 301 of FIG. 3) in a sequence of image frames may be processed. At step 404, a determination may be made as to whether a partially decoded leading edge clipped barcode is detected. In making the determination, a determination that an open or close character is imaged and that the opposite character, depending on an orientation of the code relative to the direction of travel relative to the image frames, that was read is not imaged. If it is determined that there is no clipped code, then the process may return to step 402 for processing the next odd frame (e.g., frame 3), which means skipping the next even frame (e.g., frame 2 or frame 302 of FIG. 3). If it is determined that a clipped code was read, then the process 400 may continue to step 406, where a next even frame (e.g., frame 2) is processed. In operation, the speed of the conveyer and camera are to be configured such that if a code is clipped in an odd frame, then the code will be fully contained in the next frame. The process 400 may thereafter return to step 402 for processing the next odd frame (e.g., frame 3). It should be understood that imaging codes other than barcodes may utilize the same or similar principles.

Process 1B—Modified Frame Skipping

Figure 5:
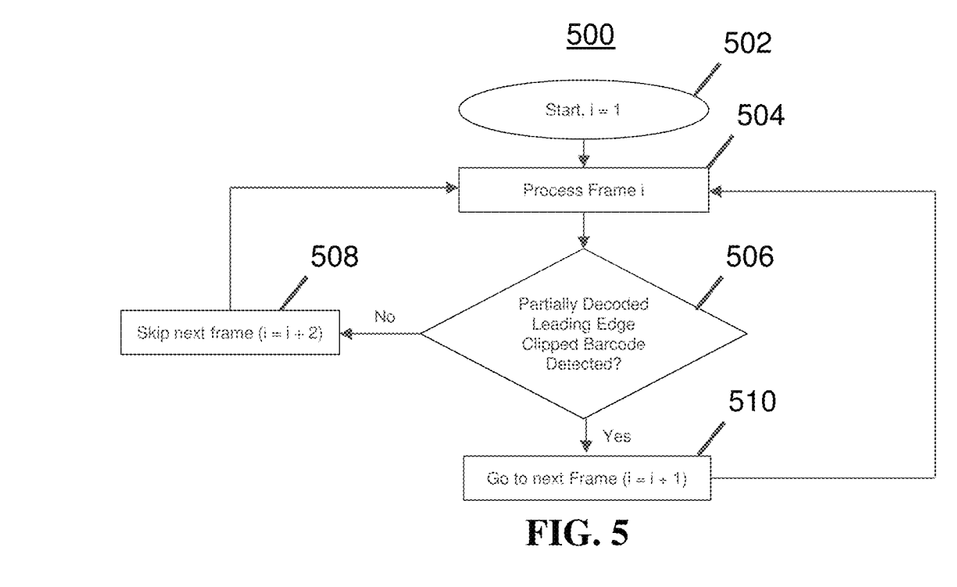
FIG. 5 is a flow diagram of a modified frame skipping process that provides for swapping from processing only next odd image frames to processing next odd or even image frames (odd-even process) depending on whether the processing swaps from skipping even frames to processing even frames, as shown in FIG. 4.
Figure 6A:
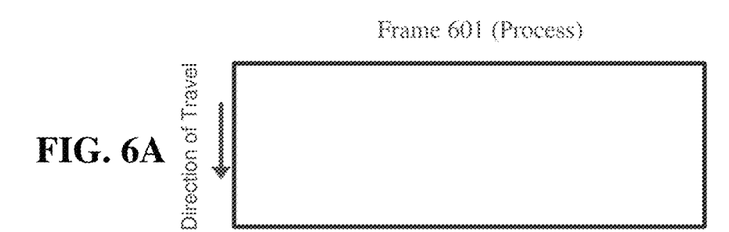
FIGS. 6A-6H are illustrations of illustrative successive image frames in which machine-readable codes are moving relative to an image capture device.
Figure 6B:
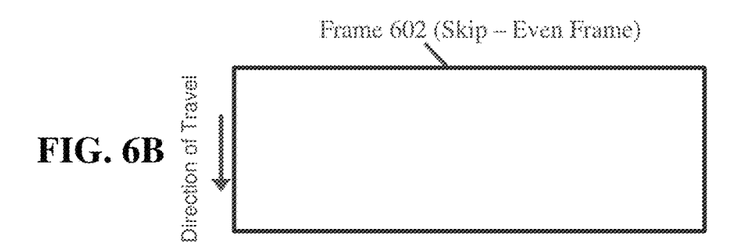
Figure 6C:
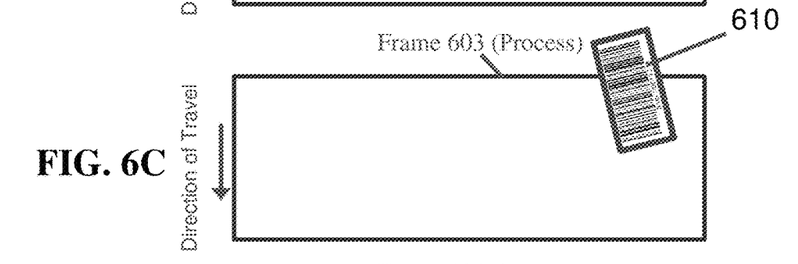
Figure 6D:
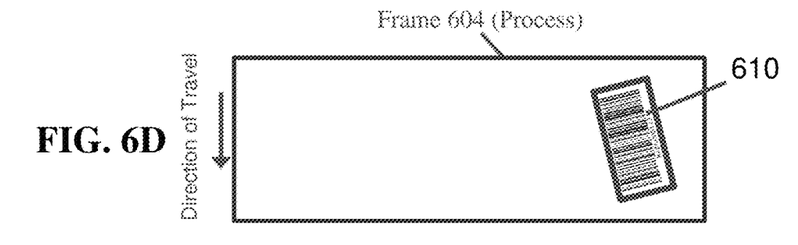
Figure 6E:
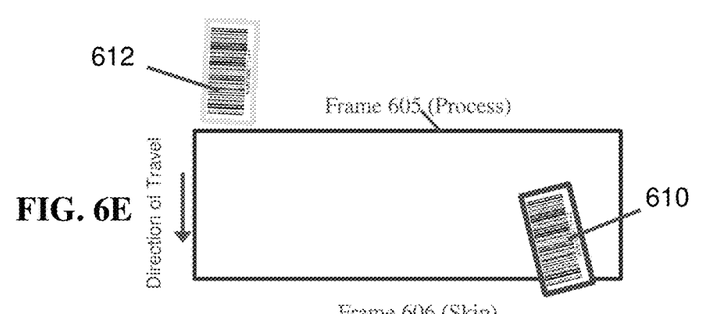
Figure 6F:
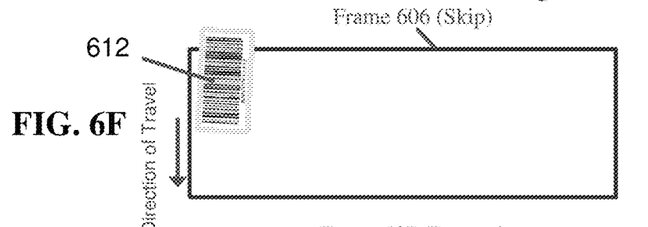
Figure 6G:
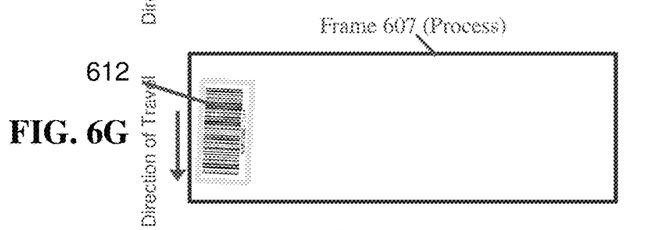
Figure 6H:
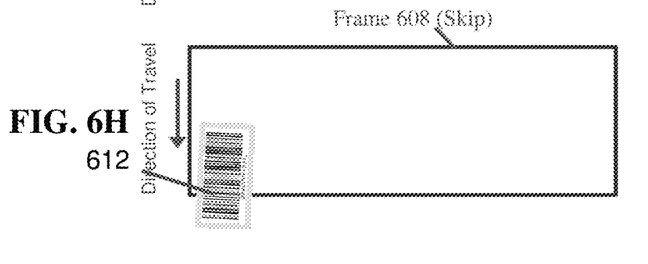

To add additional efficiency to the process 400 of FIG. 4, FIG. 5 is a flow diagram of a modified frame skipping process 500 that provides for swapping from processing only next odd frames to processing next odd or even image frames (odd-even process) depending on whether the processing swaps from skipping even frames to processing even frames, as shown in FIG. 4. The process 500 may start at step 502, where an index i may be initialized to a first value, in this case 1. At step 504, frame i may be processed to identify and read a code. The process 500 may continue at step 506, where a determination may be made as to whether a partially decoded leading edge clipped code is detected. If not, then the process may continue at step 508, and the index i may be increased by two to cause the process 500 to skip to processing the next image frame at step 504. If a clipped code is detected at step 506, then the process may continue to step 510, where the index is incremented and the next image frame is processed. The process may thereafter return to step 504, where the image frame of the incremented index is processed (i.e., processing the next image frame is not skipped). Thereafter, the process 500 continues to skip image frames until a next clipped code is detected. The process 500 improves efficiency over the process 400, as each time a clipped code is detected and the next image frame is processed, skipping image frames start from that point as opposed to returning back to processing odd image frames, as was performed in process 400 of FIG. 4.

With regard to FIGS. 6A-6H, illustrations of illustrative successive image frames 601-608 in which machine-readable codes 610 and 612 are moving relative to an image capture device are shown. The odd-even process 500 provided in FIG. 5 describes how image data captured in the image frames are processed as a function of the codes 610 and 612 moving with respect to the image frames 601-608. Starting with odd image frame 601, image data captured in the image frame 601 is processed. Because no code is clipped, then processing of even image frame 602 is skipped. Odd image frame 603 is processed. Because processing of image data of image frame 603 determines that the code 610 is clipped, even image frame 604 is processed. Image data of odd image frame 605 is next processed. Another code 612 is shown to be moving towards image frame 605, but not yet entered. Although the code 610 is clipped in image frame 605, the code 610 is clipped by a trailing edge of the image frame 605, so processing image data of image frame 606 is skipped despite the code 612 having entered image frame 606. Image data of image frame 607 is next processed, which includes determining that no clipped codes exist, and the image data of code 612 may be processed. Image frame 608 may thereafter be skipped as no clipped codes were identified in image frame 607. As is shown, three of the eight image frames 601-608 are not processed with the illustrative example of the codes 610 and 612.

Process 1C-N Frame Skipping Process

N frame skipping is a more general process in which prediction of when a clipped code will be fully visible in the frame may be made. The added complexity in the process may result in additional data reduction compared with frame skipping processes 1A or 1B, as previously described. In the N frame skipping process, significant overlap may be used, and N frames may be skipped for every image frame processed, where N is an integer greater than 1.

Assuming that the imaging system meets the constraint fov≥l+d (eqn. 1) as given above, a maximum number of frames N ($N_{max}$) that may be skipped for every 1 frame processed and still ensure one complete image of the barcode is processed is given by the following equation:

$$N_{max} = \left\lfloor \frac{fov}{d} - 1 \right\rfloor \qquad \text{(eqn. 2)}$$

Figure 7:
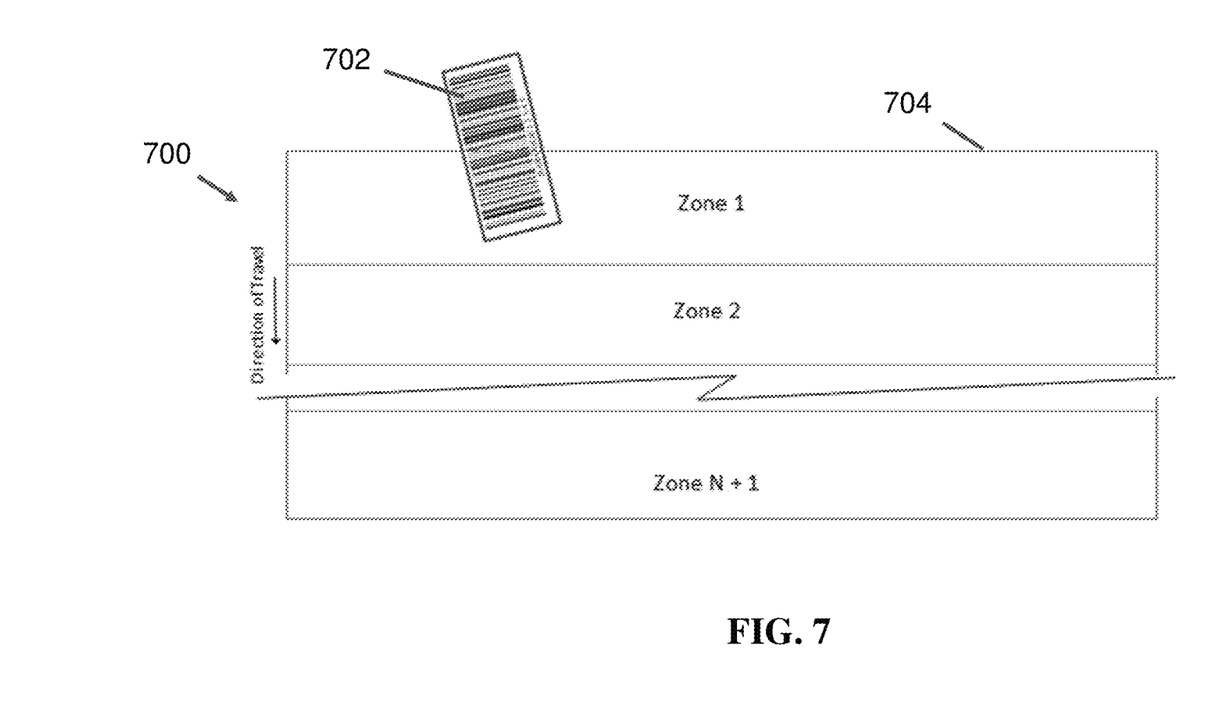
FIG. 7 is an illustration of an image frame having multiple, adjacent zones (frame 1 to frame N+1) dividing the image frame.

To achieve optimum results, a prediction may be made when a partial barcode will be fully visible in the image frame and skip any frames in between. The prediction process may be performed by (i) dividing the image into N+1 zones, as shown in FIG. 7, and (ii) determining zone in which a lowest point P of a code being imaged within an image frame is located. The zone number may thereafter be used to predict which image frame the code will be fully contained, thereby enabling the process to skip processing image data of image frames other than image frame in which the full code will be contained.

As a continued example from above, $$N_{max} = \left\lfloor \frac{fov}{d} - 1 \right\rfloor,$$

so the maximum frames that can be skipped is 2. As such, N may be set to equal Nmax (N=2), therefore the image may be divided into N+1=3 zones.

If frame 1 is processed and a clipped code is found with the lowest point in zone 1 (z=1), then the next N−z=2−1=1 frames can be skipped, so frame 2 is skipped.

Continuing, the next frame processed, therefore, is frame 3. If the code is read in frame 3 and no additional clipped codes are identified, the next N=2 frames may be skipped, which means that frames 4 and 5 are skipped. Therefore, the next frame processed is frame 6.

More particularly, FIG. 7 is an illustration of an image frame 700 having multiple, adjacent zones, shown as zone 1 to zone (N+1), dividing the image frame 700 is shown. A machine-readable code 702 is shown to be clipped by a leading edge 704 of the image frame 700. In this case the lowest point P of the code is found in zone 1. A zone counter z may be used to represent a zone in which point P is located. In this case z=1. It is known that when point P is located in zone N+1, then the entire code is visible in the scene or image frame. The point P will be located in zone N+1 in N−z+1 frames, so processing of image data in each of the next N−z frames may be skipped. It is noted that the image capture device may continuously capture image data even though the image data is going to be skipped. By skipping the N−z image frames, the number of frames to be processed may be minimized. Under typical conditions, i.e. when codes are sparsely distributed in an image, a reduction in processing approaches the following:

$$\frac{N}{(N+1)} = \frac{fov - d}{fov}. \quad \text{(eqn. 3)}$$

Figure 8:
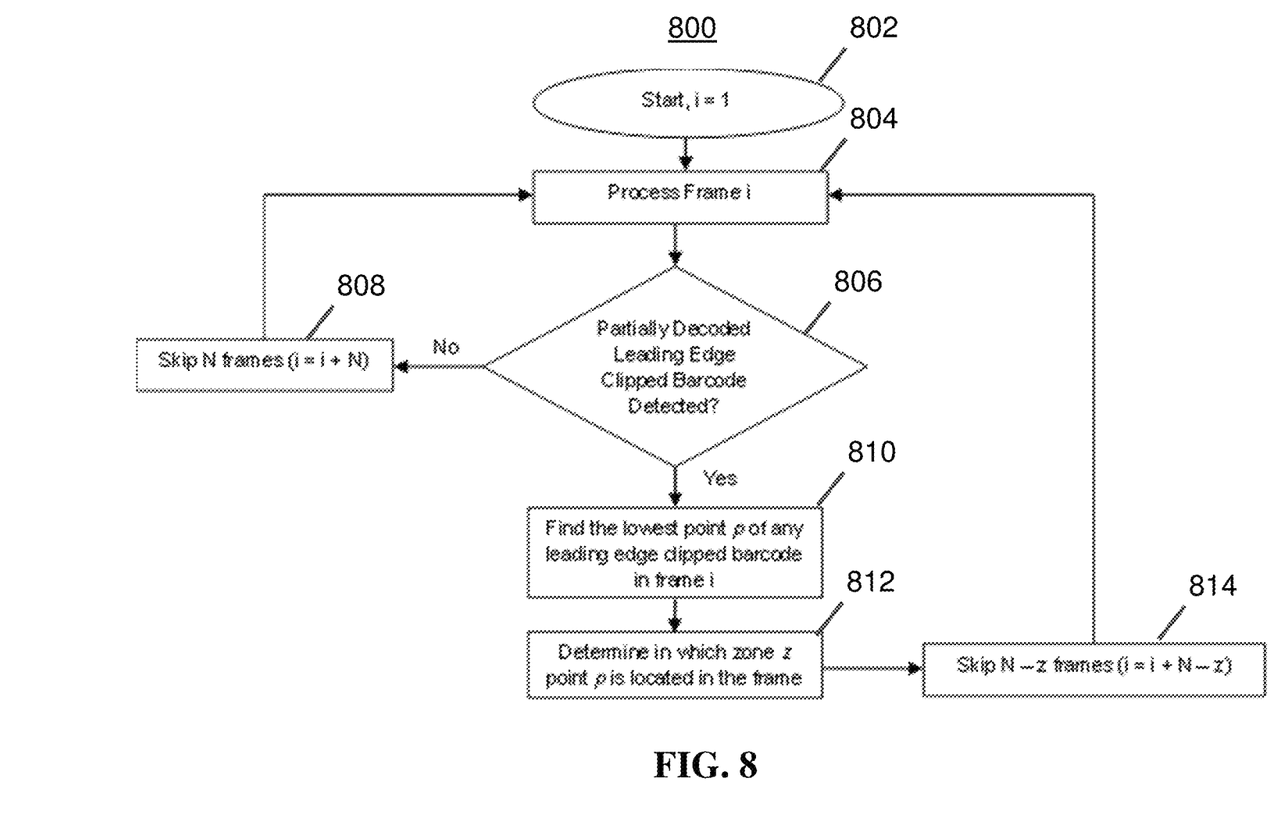
FIG. 8 is a flow diagram of an illustrative N frame skipping process that provides for reduction of image processing.

With regard to FIG. 8, a flow diagram of an illustrative N frame skipping process 800 that provides for reduction of image processing is shown. The process 800 may start at step 802, where a frame counter i may be set to a value of 1. At step 804, image frame i may be processed. In processing image frame i, image processing to identify any codes within the image frame i may be made. At step 806, a determination may be made as to whether any partially decoded codes exist due to being clipped by a leading edge of the image frame i. If not, then the frame counter i is set to i+N, where N is one less than the number of zones into which the image frame is divided. The process 800 returns to step 804 to process image frame i+N. If it is determined at step 806 that the code was clipped, then the process continues at step 810, where a lowest point P of any leading edge of the clipped code may be determined in frame i. At step 812, a determination as to which zone z the lowest point P is located may be made. At step 812, a number of frames to be skipped is determined by the formula (N−z) frames, and the index i may be set to i+(N−z). The process 800 may return to step 804 for processing image frame i.

Process 2—Partial Frame Processing

Figure 9:
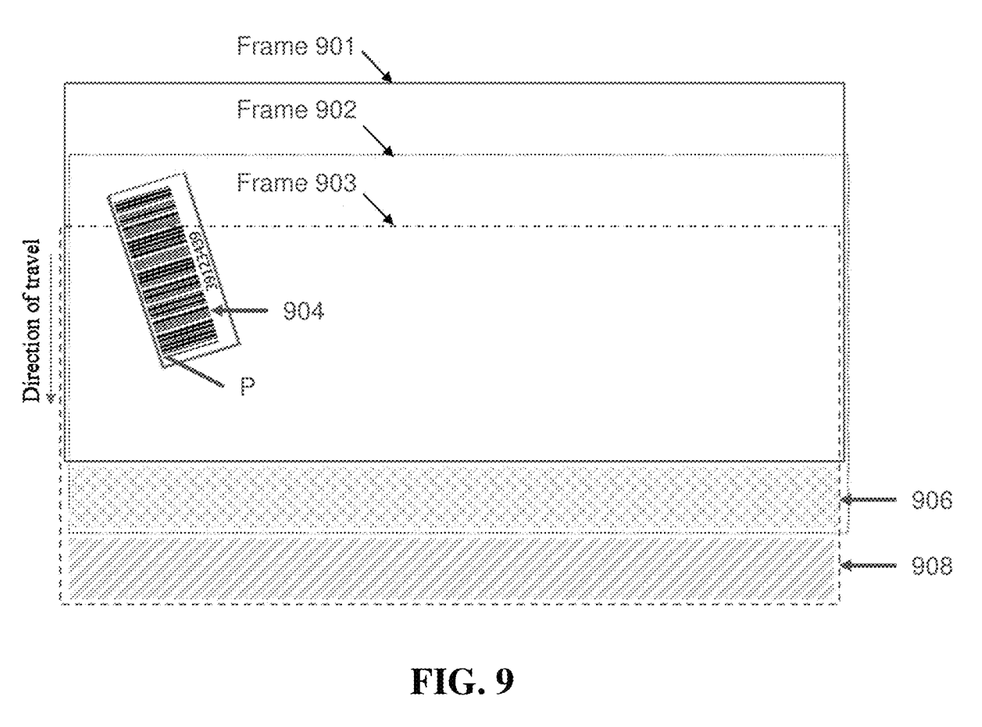
FIG. 9 is an illustration of illustrative image frames used for a partial frame imaging process to identify and image frame in which to read a machine-readable code.

With regard to FIG. 9, an illustration of illustrative image frames 901, 902, 903 used for imaging a machine-readable code 904 is shown. A partial frame processing process may be performed by decoding codes in each frame 901-903 with regions of interest (ROI) 906 and 908 of image frames 902 and 903, respectively, where the ROIs 906 and 908 are portions of image frames not covered by subsequent image frames. A decoder search is constrained to the region of interest 906 and 908 in each of the frames 902 and 903. If the decoder searches and finds any part of a barcode contained within either of the ROIs 906 and 908, the process may continue processing the code 904 beyond the extents of either of the ROIs 906 and 908 in the respective image frames 902 and 903. In this way, the process may ensure that each portion of a conveyer belt is scanned and, if the code 904 is found in any of the ROIs, such as ROIs 906 and 908, the code 904 may be fully decoded a first time as the code 904 is known to be completely contained within the respective image frame.

The minimum height of the ROI is dependent on the overlap between frames. The ROI height is given by equation 4 provided below:

$$ROI_{height} \geq \frac{d}{fov} h \quad \text{(eqn. 4)}$$

where:
d=belt travel between successive frames [mm];
fov=field of view along the direction of travel at the near reading distance [mm]; and
h=height of the image in pixels.

A reduction in pixels searched for codes is given by $$\frac{fov - d}{fov}, \quad \text{(eqn. 5)}$$

which matches the result from process 1B provided above when working in usual conditions. The reduction in area having to be processed is $$\frac{162 - 42}{162} = 74\%$$

of the number of area searched, which is equal to the total overlap in the near distance.

Note that the ROIs could be positioned at a leading edge of the image frames (i.e., the part of the image not already covered by preceding frames). In this case, the code would be read earlier (e.g., the first time the code is completely readable), but potentially many partial decodes would have to be performed before a complete read of a code in an image frame.

The frame rate is usually computed to produce the minimum overlap area. In some cases, however, the acquisition frame rate is higher. In these cases, the overlap area between two adjacent frames may be very high, and processing one frame every N frames may be advantageous. In these cases, the non-overlapping area used to compute the ROI is the non-overlapping area of two processed frames. In an embodiment, N may be set to 1. Other values of N may be used for higher redundancy applications.

Figure 10:
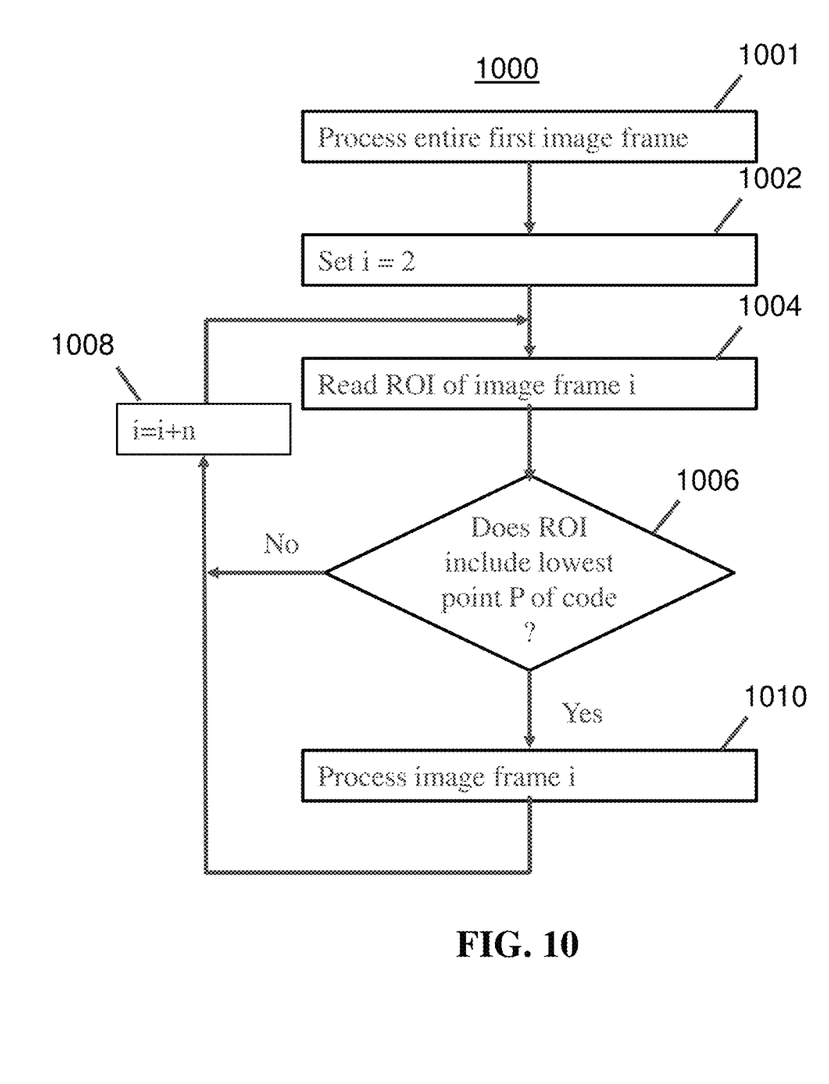
FIG. 10 is a flow diagram of an illustrative partial frame imaging process to identify an image frame in which a code is located

With regard to FIG. 10, a flow diagram of an illustrative partial frame imaging process 1000 to identify an image frame in which a code is located is shown. The process 1000 may start at step 1001, where an entire first image frame may be processed. At 1002, a frame counter i may be set to 2 so as to skip the first image frame already processed. At step 1004, a region of interest of frame i that does not overlap frame i−1 may be read or otherwise decoded. A determination as to whether a lowest point P of a code is positioned in the ROI of frame i at step 1006. The determination may be made based on decoding a portion of the code to determine that an open character or a close character is read within the ROI of image frame i. Alternatively, a determination that any portion (e.g., portion that does not include a fully decodable identifiable character) of a code exists within the ROI of image frame i, and a lowest point P of that code portion may be determined. Additionally, multiple lowest points $P_1, P_2, \ldots P_k$, could be found. If no point is identified, then the process may continue at step 1008, where the frame counter i may be incremented. The process 1000 may thereafter return to step 1004. If, however, the determination at step 1006 is that the lowest point P of the code without concern of clipping is within the ROI of frame i, then the process may continue to step 1010, where the code is completely processed using the data from the entire image frame i. The process 1000 may continue at step 1008 to increase the frame counter i for further processing. In another embodiment, a similar algorithm may be applied when selecting the ROIs positioned at a leading edge of an image frame as opposed to a trailing edge.

Redundancy

Note that the above-described methods work correctly if a machine-readable code is completely included in an image is readable. In the real-world, reflections, shadows, and other imaging limitations may affect the code image, and analyzing redundant frames may help increase the accurate read-rate.

The described processes allow leaving a certain processing redundancy if allowed by the computing power of a processing unit. For example, in process 2 described above, increasing height of the analyzed ROI allows for detecting and trying to decode a code multiple times. In process 1, redundant frames may be processed if the processing queue is empty and/or if a partial decode was detected in a previous image frame that was not clipped by a leading edge of the image frame.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A system for processing a machine-readable code associated with an object moving relative to an imaging device, the system comprising:
    an imaging device (i) including an image sensor configured to capture multiple image frames at a frame rate and (ii) having a field-of-view (FOV) being greater than or equal to a sum of a length of a machine-readable code and distance of travel of the moving object between successive frames, the frames having a leading edge and a trailing edge, and with successive frames being arranged in an overlapping manner along the direction of travel of the moving object;
    a non-transitory memory configured to store image data captured in image frames; and
    a processing unit in communication with the imaging device and the non-transitory memory, and configured to:
        process a captured image of the machine-readable code; and
        determine whether image data of the machine-readable code is clipped along a leading edge of a first image frame and in response thereto:
            process image data contained in a subsequent image frame being at least two frames away from the first image frame based on a determination that the image data of the machine-readable code is clipped along the leading edge of the first image frame, or
            skip processing the image data in the subsequent image frame based on a determination that the image data of the machine-readable code is not clipped along the leading edge of the first image frame.

2. The system according to claim 1, wherein the subsequent frame is a successive image frame after the first image frame.

3. The system according to claim 1, wherein the processing unit is further configured to:
    determine whether image data of the machine-readable code is clipped by a leading edge of the subsequent frame, and in response thereto:
        skip processing image data of the subsequent image frame responsive to a determination that the image data of the machine-readable code is clipped along the leading edge of the subsequent image frame, or
        process the image data of the subsequent image frame responsive to a determination that the image data of the machine-readable code is not clipped along the leading edge of the subsequent image frame.

4. The system according to claim 1, wherein the processing unit, in determining that the image frame is clipped, is configured to determine that only one of an open character or a close character is captured in the first image frame.

5. The system according to claim 1, wherein the processing unit is further configured to:
    divide the first image frame into multiple zones along a direction of travel of the moving object;
    in response to determining that the image data of the machine-readable code is clipped:
        determine a lowest point P of the machine-readable code in the image data of the clipped machine-readable code;
        determine which of the zones z the lowest point P is located in the image frame; and
        skip processing the image data of the next (N-z) image frames, where N is one less than a total number of zones the image frame is divided;
    otherwise, skip processing N image frames.

6. The system according to claim 1, wherein the processing unit, in skipping processing of the at least one image frame, the processing unit is further configured to skip processing image data of a next even image frame.

7. A method for processing a machine-readable code associated with an object moving relative to an imaging device, the method comprising:
    imaging the machine-readable code; and
        determining whether image data of the machine-readable code is clipped along a leading edge of a first image frame captured by the imaging device, and, in response thereto:
        processing image data contained in a subsequent image frame being at least two frames away from the first image frame based on a determination of the machine-readable code being clipped along the leading edge of the first image frame, or
        skipping processing the image data in the subsequent image frame based on a determination of the machine-readable code not being clipped along the leading edge of the first image frame.

8. The method according to claim 7, wherein skipping processing image data in the subsequent frame includes skipping processing image data in the successive image frame after the first image frame.

9. The method according to claim 7, further comprising determining whether image data of the machine-readable code is clipped by a leading edge of the subsequent frame, and if so, skipping processing image data of the subsequent image frame in response to the determination, otherwise, processing the image data of the subsequent image frame.

10. The method according to claim 7, wherein determining that the image frame is clipped includes determining that only one of an open character or a close character is captured in the first image frame.

11. The method according to claim 7, further comprising:
    dividing the first image frame into multiple zones along a direction of travel of the moving object;
    in response to determining that the image data of the machine-readable code is clipped:
        determining a lowest point P of the machine-readable code in the image data of the clipped machine-readable code;
        determining which of the zones z the lowest point P is located in the image frame; and skipping processing image data of the next (N-z) image frames, where N is one less than a total number of zones into which the image frame is divided;

otherwise, skipping processing N image frames.

12. The method according to claim 7, wherein skipping processing the subsequent image frame includes skipping processing image data of a next even image frame.

13. A method for processing a machine-readable code without image stitching, the method comprising:

capturing a plurality of image frames of a scene including an object moving relative to an imaging device of a code reader, each image frame having a leading edge and a trailing edge relative to encountering the object along a direction of motion; and performing frame skipping from processing one or more image frames based on a result of a prior determination regarding whether a machine-readable code associated with the object is dipped along the leading edge one of the image frames of the plurality of image frames, the frame skipping including:

setting an index (i) to an initial value, the index (i) representing a frame to be processed for decoding;

increasing the index (i) by a first value responsive to the responsive to the machine-readable code associated with the object being dipped along the leading edge of one of the image frames of the plurality; and increasing the index (i) by a second value responsive to the responsive to the machine-readable code associated with the object not being dipped along the leading edge of one of the image frames of the plurality, wherein the second value is greater than the first value, the first value being one and the second value being two; and decoding the machine-readable code based on a processed image frame without image stitching.

14. The method according to claim 13, wherein performing image skipping includes:

processing selected ones of the one or more image frames responsive to the prior determination being that the machine-readable code associated with the object is clipped along the leading edge of one of the image frames of the plurality, or skipping the selected ones of the one or more image frames responsive to the prior determination being that the machine-readable code associated with the object is clipped along the leading edge of one of the image frames of the plurality, wherein the skipping the selected ones of the one or more frames is based on an odd-even process that is based on whether the leading edge of the image frame in question is an odd or even frame.

15. The method accord to claim 13, wherein the difference between the first value and the second value is dynamically adjustable each time an image frame is processed based on a detected location of machine-readable codes within the image frame.

16. The method according to claim 13, wherein performing image skipping includes:

skipping one or more image frames at a time from processing until detecting that the machine-readable code associated with the object is clipped along the leading edge of one of the image frames of the plurality, after which at least the next successive image frame is processed for decoding.

17. A method for processing a machine-readable code associated with an object moving relative to an imaging device, the method comprising:

imaging the machine-readable code; and determining whether image data of the machine-readable code is clipped along a leading edge of a first image frame captured by the imaging device, and, in response thereto:

processing image data contained in a subsequent image frame based on a determination of the machine-readable code being clipped along the leading edge of the first image frame, or skipping processing the image data in the subsequent image frame based on a determination of the machine-readable code not being clipped along the leading edge of the first image frame;

dividing the first image frame into multiple zones along a direction of travel of the moving object;

in response to determining that the image data of the machine-readable code is clipped:

determining a lowest point P of the machine-readable code in the image data of the clipped machine-readable code;

determining which of the zones z the lowest point P is located in the image frame; and skipping processing image data of the next (N-z) image frames, where N is one less than a total number of zones into which the image frame is divided;

otherwise, skipping processing N image frames.

18. The method according to claim 17, wherein processing image data contained in the image data contained in a subsequent image frame includes processing image data contained in the image data contained in a subsequent image frame that is at least two frames away from the first image frame.

19. The method according to claim 17, wherein skipping processing the subsequent image frame includes skipping processing image data of a next even image frame.

* * * * *